Jon W. Martin
John F. Jones
Jeffrey L. Bell
INVENTORS

Fig. 4
Mag: 1000 X
26% v Hystl B5000 in EPT
Fig. 5
Mag: 1000 X
9.1% Hystl B5000 in EPT
Fig. 6

United States Patent Office 3,741,931
Patented June 26, 1973

3,741,931
POLYOLEFIN RUBBERS REACTED WITH BUTADIENE RESINS
Jon W. Martin, Los Alamitos, John F. Jones, Torrance, and Jeffrey L. Bell, Anaheim, Calif., assignors to TRW Inc., Redondo Beach, Calif.
Filed Nov. 23, 1970, Ser. No. 92,004
Int. Cl. C08d 9/04; C08f 45/04, 45/08
U.S. Cl. 260—41.5 R                10 Claims

ABSTRACT OF THE DISCLOSURE

Polyolefin rubbers are reacted with a low molecular weight butadiene resin and further reinforced with a silica filler. This provides a vulcanized elastomer compound having excellent long-term compatibility and maintenance of mechanical properties when exposed to corrosive environments.

BACKGROUND OF THE INVENTION

This invention relates to new and improved elastomeric compositions and more specifically to cured products of polyolefin rubbers and low molecular weight polybutadiene resins. The elastomers of the present invention may be employed as valve seats; when used in conjunction with a plunger, control of hydrazine flow through a valve can be obtained.

Elastomer compounds for valve seats which contact hydrazine require that the elastomer have suitable mechanical properties. Further, the elastomer must be chemically inert to hydrazine. Also, the mechanical properties must not change during or following exposure to hydrazine when the elastomer is under stress. The mechanical properties of most concern are swelling and compression deformation. Unfilled olefin polymers are not used for valve seats because they lack hardness and strength. On the other hand, low molecular weight polybutadiene resins which have been subsequently cured, are too hard and brittle for use as valve seats.

It is, therefore, an object of this invention to provide a composition of matter suitable for use in a hydrazine environment.

Another object is to produce an elastomer comprising a cured polyolefin rubber matrix containing particles of a 1,2-polybutadiene resin and a filler.

Another object is to produce a composition of matter comprising a polyolefin rubber reacted with particles of a liquid 1,2-polybutadiene resin and containing fillers such as carbon black, silica and alumina.

Other objects of the invention will be disclosed from diagrams and the description to follow in which:

FIGS. 1–4 are photographs of valve seats made from elastomeric compositions including a commercially available control which were subjected to open-close cycle tests for control of hot hydrazine flow.

FIGS. 5 and 6 are stereoscan electron micrographs showing polybutadiene particles in a matrix of a polyolefin rubber.

THE INVENTION

Figure 1:
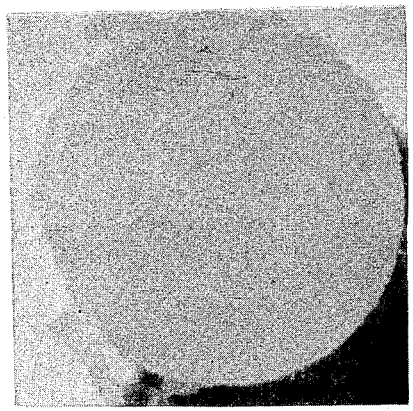

According to the invention, a new elastomer composition for service in corrosive environments is provided by blending together a hydrocarbon rubber base polymer, a liquid polybutadiene resin and a filler and then curing the resulting mixture with a catalyst. Preferred fillers such as silica, alumina or carbon black are incorporated into the blend in order to obtain desired mechanical properties.

Preferred concentrations of the components in the elastomer are as follows:
Polyolefin rubber—40% to 94% by weight; a liquid derived polybutadiene resin—2%–35% by weight; and filler 2% to 40% by weight.

In the preferred embodiment of the invention, ethylene/propylene copolymers (E/P) or ethylene/propylene/diene terpolymers (EPDM) are employed as the base polymer, and a polybutadiene resin of about 3000 molecular weight and high in butadiene units of 1,2-configuration is incorporated therein. The butadiene resin renders the cured products resistant to elution and intrusion by many corrosive chemical agents, such as hydrazine.

In the preferred embodiment of this invention, silicon dioxide is used as the filler.

Preferably, a peroxide is employed as the cure catalyst.

Typical polyolefin rubbers which may be employed in this invention include: ethylene/propylene copolymers, ethylene/propylene/diene terpolymers, isobutylene/isoprene copolymers; isoprene homopolymers, isoprene/acrylonitrile copolymers, butadiene homopolymers, butadiene/acrylonitrile copolymers, isobutylene homopolymers, and styrene/butadiene copolymers.

A typical EPDM which may be employed in this invention is an amorphous material sold by the E. I. du Pont de Nemours and Co. Ltd., under the trade name of Nordel 1040. This material has a high molecular weight as shown by its Mooney viscosity value (ML at 250° F.) of 40. A correlation of glass transition temperature with ethylene/propylene ratio is reported by J. J. Maurer in Rubber Chem. and Technology 38, 979 (1965). This indicates the Nordel 1040 polymer contains about 25–30 mole-percent propylene, about 70–75 mole-percent ethylene and 1–2 mole-percent unconjugated diene. Several unconjugated dienes may be used to form this type of terpolymer including dicyclopentadiene, methylene norbornene, ethylidene norbornene and 1,4-hexadiene. Analytical data reported by K. Kiyimoto and S. Nakade in J. Appl. Polymer Science, 13, 1509 (1969), established that Nordel 1040 contains 1,4-hexadiene as the termonomer. To ensure that the Nordel 1040 contained no hydrazine reactive material, it was successively extracted with boiling methyl alcohol and boiling methyl ethyl ketone. It was dried of slovent under vacuum and a small amount of a steric hindered phenol antioxidant, Ionol (2,6-di-tert-butyl-4-methyl phenol), sold by the Shell Chemical Co., was added by mixing on a two-roll rubber mill.

A typical polybutadiene resin which may be used is sold by the HYSTL Development Co. under the trade name of B–3000, and is produced by the conventional ionic polymerization of 1,3-butadiene. The B–3000 resin contains a minimum of 84% butadiene units in the vinyl configuration and 6% minimum of the unsaturated butadiene units in the trans configuration. It has a number average molecular weight of 3000±300 as determined by a Hewlett-Packard Vapor Pressure Osmometer (Model 302) which has been calibrated using pure benzil as a standard.

If desired, liquid polybutadienes which are employed may be chain-terminated by reactive groups such as hydroxy, epoxides, amides, etc. Examples of liquid 1,2-polybutadienes which have these chain-terminating groups are disclosed in Pat. No. 3,431,235. However, the chain-terminated form of the 1,2-polybutadienes does not appear to confer any particular advantage to the final product; hence, the preferred form of the liquid 1,2-polybutadienes simply employs hydrogen at the ends of the molecule rather than containing reactive chain-terminating groups.

Employing Scanning Electron Microscope techniques, it has been determined that the optimum properties of the elastomer result when the polybutadiene resin particles have a maximum size of 0.5–1.0 micron in diameter and are thoroughly dispersed throughout the polyolefin rubber matrix. Typical particle distributions and sizes are shown in FIGS. 5 and 6. The preferred size range is produced when the polybutadiene content varies from about 10% to about 40% by weight of the total composition.

The preferred number average molecular weight range of the polybutadiene varies from about 500–10,000 as measured by the Hewlett-Packard device.

A suitable silicon dioxide filler is sold by the Godfrey Cabot Corp. under the trade name of Cab-O-Sil M-5. This material contains more than 99% by weight amorphous silicon dioxide of nominal 12 millimicron particle size and 200±25 m.²/gm. surface area; it is prepared by the high temperature hydrolysis of silicon tetrachloride.

While many peroxide catalysts will provide the desired results, it is preferred to employ peroxides which have measured half-lives (in benzene solution) at 300° F. between one second and thirty minutes. An example of such a peroxide is dicumyl peroxide sold by the Hercules Powder Co. as Di-Cup R. This catalyst contains about 98% active dicumyl peroxide and has a measured half-life in benzene solution at 300° F. of about 5 minutes. This catalyst generates a curing reaction by the formation of free radicals on the rubber polymer backbone and on the butadiene resin polymer chain.

Preferred catalysts which may be employed will have a suitable half-life at the temperature employed for curing to take place during a reasonable reaction time and especially those catalysts of the organic peroxy type such as: di-t-butyl peroxide, 2,5-dimethyl-2,5-bis(t-butylperoxy) hexane, n-butyl-4,4-bis(t-butylperoxy) valerate, 2,5-dimethyl - 2,5 - bis(t-butylperoxy) hexyne-3, t-butyl perbenzoate, dicumyl peroxide, methyl ethyl ketone peroxide, cumene hydroperoxide, di-N-methyl-t-butyl percarbamate, lauroyl peroxide, acetyl peroxide, decanoyl peroxide, t-butyl peracetate, t-butyl peroxyisobutyrate, and t-butyl-perpivalate.

In order to cure the composition, the components are blended together and then heated for a suitable time and temperature in a closed system. The times and temperatures of the curing reaction are determined by the half-life time of the catalyst at the curing temperature; usually, 5–10 of these half-lives are used which reduces the residual active peroxide content to between 3.125% and 0.098% of the concentration originally added. Cure times may vary from about 5 minutes to 90 minutes while cure temperatures may vary from about 300° F. to 400° F. To purge volatiles from the cured composition, a post cure at 350° F. for 30 minutes may be employed; oven post cure times of about 2 hours at about 225° F. are also effective for this purpose.

Blending of the components is accomplished using standard rubber technology; this permits the use of roll mills, Banbury mixers, etc. to blend the components. When a 2-roll rubber mill is employed, a suitable surface speed ratio between the rolls is 1.25:1. The elastomer and resin components are blended together followed by the auxiliary filler and then the cure catalyst.

The following examples in Table 1 show the effect of the individual components upon the mechainical properties of the elastomer.

TABLE 1.—FORMULATIONS OF COMPOUNDS

|  | 1 | 2 | 3 | 4 |
|---|---|---|---|---|
| EPT, Nordel 1040, Du Pont | 100 | 100 | 100 | 100 |
| Silicon dioxide, Cab-O-Sil M-5, Cabot Corp |  |  | 25 | 90 |
| Liquid 1, 2-polybutadiene resin, HYSTL Development Co. (B-3000) |  | 50 | 25 |  |
| Dicumyl peroxide, Di-Cup R, Hercules Powder Co | 1 | 5 | 5 | 7 |
| Total parts (by weight) | 104 | 155 | 155 | 197 |
| Tensile strength (p.s.i.) | 150 | 1,125 | 1,800 | 1,075 |
| Hardness (Shore A) | 40 | 88 | 90 | >100 |

It will be observed that Compound 1 which contains only the ethylene/propylene/unconjugated diene terepolymer (EPDM), exhibits very low strength and hardness properties when cured with a peroxide catalyst.

As shown in Compound 2, the addition of 1,2-polybutadiene resin provides an improvement in hardness and strength.

Further, Compound 3, which represents an elastomer of this invention, shows a significant improvement in hardness and strength is obtained by replacing some of the 1,2-polybutadiene resin with silicon dioxide.

However, Compound 4 shows that total replacement of the 1,2-polybutadiene resin by an equal volume of silicon dioxide results in lower strength and very high hardness.

The final elastomer composition, of course, will contain little catalyst since it will have been consumed during the five to ten half-lives of the cure reaction.

Figure 2:

As shown in FIG. 1, Compound 3 containing EPT, 1,2-polybutadiene resin and silicon dioxide filler is less degraded than Compound 4 (shown in FIG. 2) containing EPT and silicon with no 1,2-polybutadiene resin. Compounds 3 and 4 are both shown after 800,000 cycles at 160° F. and in flowing hydrazine.

Figure 3:
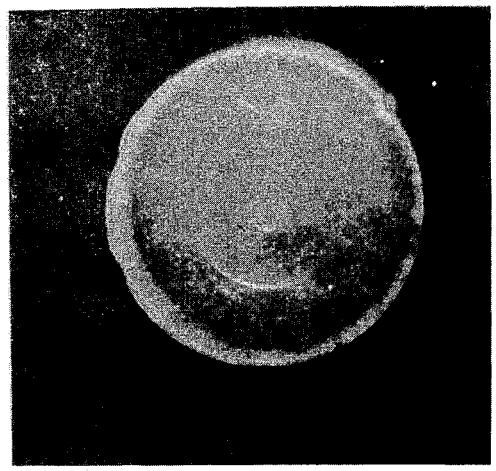

In another test, Compound 3 and a control were tested for effectiveness as valve seats to control flowing hydrazine. Both the U.S. Government and commercial operators employ the control material as a valve seat in a hydrazine environment in present earth orbit satellites. Valve cycle conditions of 160° F. for 79 days were selected to simulate an accelerated satellite station-keeping service. The condition of the valve seats after the test is shown in FIGS. 3 and 4 respectively. It will be observed that the valve seat of Compound 3, which employs the composition of this invention, is clearly superior to the control seat.

To evaluate the compatibility of the compositions with hydrazine, specimens first were cut from cured sheets and placed under a load of 125 p.s.i. Then, the elastomer under load was totally immersed in a test cell containing hydrazine which was then heated to 160° F. for 100 hours. The elastomer was then removed, dried and subjected to mechanical property testing. The hardness (Shore A) and also tensile strength and elongation at break were unaffected when compared with unexposed specimens taken from the same batch.

By comparison, the control compound stressed at 125 p.s.i. for 100 hours in 160° F. hydrazine lost 3 Shore A hardness points, 23.5% of its original tensile strength and 40.5% of its original elongation at break.

Storing the materials of this invention in 75° F. hydrazine for 24 hours produced no change in volume of the elastomer. By contrast, the control was found to swell 3% by volume when stored in 75° F. hydrazine for 24 hours.

Tables 2 and 3 further show the proportions and effect of the individual components in determining the properties of the final elastomer composite. All the materials were blended by milling and cured by pressing for 30 minutes at 350° followed by a post cure of 1.5 hours at 300° F. in oven air.

TABLE 2.—COMPOSITIONS OF POLYOLEFIN RUBBER COMPOUNDS CONTAINING 1,2-POLYBUTADIENE RESINS

[All parts by weight]

| | 7 | 8 | 9 | 10 | 11 | 12 |
|---|---|---|---|---|---|---|
| EPT Nordel 1040 | 100 | 100 | | | 100 | 100 |
| EPR Enjay 404 [1] | | | 100 | 100 | | |
| Nippon G 2000 [2] | 45 | | 50 | | | 50 |
| HYSTL B-5000 [3] | | 50 | | 50 | 25 | |
| Isonate 143-L [4] | 44 | | | | | |
| Alon Alumina [5] | | | | | 85 | |
| Di-Cup-R [6] | 6 | 6 | 6 | 6 | 7 | 6 |

[1] A Ziegler type ethylene-propylene copolymer sold by the Enjay Chemical Co. The copolymer was essentially saturated and contained about 40-46% ethylene and correspondingly 60-54% propylene.
[2] An —OH terminated 1,2-polybutadiene resin sold by the Nippon Industrial Chemical Co. Ltd. It had a number average molecular weight of about 2,000±200 as determined using the same technique employing the Hewlett-Packard device, supra.
[3] A 1,2-polybutadiene having a number average molecular weight of about 5,000±500 as determined using the Hewlett-Packard device. The molecules had no reactive end groups.
[4] A modified methylene diphenyl diisocyanate sold by the Upjohn Company. It had the following characteristics: Isocyanate equivalent: 144; viscosity at 25° C.: 30 cps.; hydrolyzable chloride (percent max.): 0.05; specific gravity (at 25° C.): 1.22; vapor pressure (mm. Hg) at 100 °C.: 0.1; at 175° C.: 1.0.
[5] 99% fumed $Al_2O_3$ sold by the Cabot Corp.
[6] 98% dicumyl peroxide sold by Hercules Powder Co.

Evaluation of the physical properties of the compositions in Table 2 are as follows:

TABLE 3

| | 7 | 8 | 9 | 10 | 11 | 12 |
|---|---|---|---|---|---|---|
| Tensile strength at break (p.s.i.) | 1,200 | 1,125 | 1,200 | 650 | 1,900 | 1,050 |
| Elongation (percent) at break | 100 | 120 | 110 | 35 | 650 | 55 |
| Shore A Hardness (durometer) | 90 | 88 | 85 | 86 | 82 | 88 |

It will be observed that composition 11, which represents an elastomer of this invention and which contains the polyolefin rubber, 1,2-polybutadiene and filler, is clearly superior in physical properties to the other compositions. Composition 11 is suitable as a gasket in steam applications.

Thus, it is clearly evident that the elastomer compositions disclosed in this invention are significantly more resistant to degradation from contact with hydrazine than state-of-the-art materials and/or have improved physical properties compared to their individual components.

We claim:

1. A peroxide-cured elastomeric composition comprising:
   a polyolefin rubber matrix: 48%-94%;
   a liquid derived 1,2-polybutadiene resin: 2%-40%, containing a minimum of 84% butadiene units in the vinyl configuration; and filler 2%-35%, all percentage parts by weight.

2. A peroxide-cured elastomeric composition comprising:
   a polyolefin rubber matrix: 40%-94%;
   a liquid derived 1,2-polybutadiene resin 10%-40%, containing a minimum of 84% butadiene units in the vinyl configuration; and
   filler: 2%-35%, all percentage parts by weight, the maximum particle size of the polybutadiene resin varying from about 0.5-1.0 micron in diameter.

3. A peroxide-cured elastomeric composition comprising:
   a polyolefin rubber matrix: 40%-94%;
   a liquid derived 1,2-polybutadiene resin: 2%-40%, containing a minimum of 84% butadiene units in the vinyl configuration and 6% minimum in the trans configuration; and
   filler: 2%-35%, all percentage parts by weight, the maximum particle size of the polybutadiene resin varying from about 0.5-1.0 micron in diameter and the number average molecular weight of the starting liquid polybutadiene varying from about 500 to about 10,000.

4. The elastomeric composition of claim 2 in which the polyolefin rubber matrix is selected from the class consisting of:
   ethylene/propylene copolymers;
   ethylene/propylene/diene terpolymers;
   isobutylene/isoprene copolymers;
   isoprene/acrylonitrile copolymers;
   butadiene homopolymers;
   butadiene/acrylonitrile copolymers;
   isobutylene homopolymers; and
   styrene/butadiene copolymers.

5. The elastomer of claim 2 in which the number average molecular weight of the liquid polybutadiene varies from about 500 to about 10,000.

6. The elastomer of claim 2 in which the filler is selected from the gas consisting of: silica, alumina and carbon black.

7. The elastomeric composition of claim 3 in which the polyolefin rubber contains about:
   25-30 mole percent of propylene;
   about 70-75 mole percent ethylene and about 1-2 mole percent conjugated diene;
   the liquid 1,2-polybutadiene has an average molecular weight of about 3000 and the molecule contains a minimum of 84% butadiene units in the vinyl configuration and 6% minimum trans unsaturated butadiene units; and
   the filler is silicon dioxide.

8. The elastomer of claim 7 in which the said diene is 1,4-hexadiene.

9. The elastomer of claim 8 in which the silicon dioxide filler has a particle size of about 12 millimicrons and a surface of about 200 m.²/gm.

10. The elastomer of claim 9 in which the said polybutadiene is chain terminated with hydrogen.

References Cited

UNITED STATES PATENTS

| 3,366,585 | 1/1968 | Davidson et al. | 260—5 |
| 3,281,389 | 10/1966 | Hirshfield | 260—33.6 |
| 3,083,175 | 3/1963 | Safford | 260—45.5 |
| 2,867,603 | 1/1959 | Safford | 260—45.5 |
| 2,832,748 | 4/1958 | Safford | 260—45.5 |
| 3,501,422 | 3/1970 | Nordsiek | 260—5 |
| 3,224,985 | 12/1965 | Gladding et al. | 260—5 |
| 3,635,922 | 1/1972 | Cheng | 260—83.7 |
| 3,607,984 | 9/1971 | Massovlre | 260—888 |
| 3,586,661 | 6/1971 | Parris | 260—85.3 |
| 3,431,235 | 4/1969 | Lubowitz | 260—47 |

ALLAN LIEBERMAN, Primary Examiner

R. ZAITLEN, Assistant Examiner

U.S. Cl. X.R.

260—41.5 A, 889, 894